United States Patent
Sauter et al.

(10) Patent No.: US 10,272,880 B2
(45) Date of Patent: Apr. 30, 2019

(54) WIPER DEVICE (71) Applicant: Robert Bosch GmbH, Stuttgart (DE)

(72) Inventors: Christian Sauter, Karlsruhe (DE);
Waldemar Ernst, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 248 days.

(21) Appl. No.: 14/758,487

(22) PCT Filed: Dec. 9, 2013

(86) PCT No.: PCT/EP2013/075936
§ 371 (c)(1),
(2) Date: Jun. 29, 2015

(87) PCT Pub. No.: WO2014/102052
PCT Pub. Date: Jul. 3, 2014

(65) Prior Publication Data
US 2015/0336542 A1    Nov. 26, 2015

(30) Foreign Application Priority Data
Dec. 28, 2012    (DE) .................. 10 2012 224 472

(51) Int. Cl.
*B60S 1/38* (2006.01)
*B60S 1/46* (2006.01)
*B60S 1/28* (2006.01)
*B60S 1/34* (2006.01)

(52) U.S. Cl.
CPC . *B60S 1/38* (2013.01); *B60S 1/28* (2013.01); *B60S 1/3404* (2013.01); *B60S 1/3463* (2013.01); *B60S 1/46* (2013.01); *B60S 2001/3824* (2013.01); *B60S 2001/3829* (2013.01); *B60S 2001/3831* (2013.01); *B60S 2001/3832* (2013.01); *B60S 2001/3834* (2013.01); *B60S 2001/3837* (2013.01)

(58) Field of Classification Search
CPC ...... B60S 1/38; B60S 2001/3837; B60S 1/28; B60S 1/46; B29D 9/00
USPC .............................. 15/250.4, 250.04, 250.41
See application file for complete search history.

(56) References Cited

U.S. PATENT DOCUMENTS 6,763,546 B1 * 7/2004 Smith ...................... B60S 1/38
                                                                15/250.04
9,358,956 B2 * 6/2016 Pinto, IV .............. B60S 1/3801

FOREIGN PATENT DOCUMENTS

| CN | 1386099 A | 12/2002 |
|---|---|---|
| DE | 1170806 | 5/1964 |
| DE | 2705700 | 8/1978 |

(Continued)

OTHER PUBLICATIONS

International Search Report for Application No. PCT/EP2013/075936 dated Jan. 31, 2014 (English Translation, 3 pages).

*Primary Examiner* — Monica S Carter
*Assistant Examiner* — Katina N. Henson
(74) *Attorney, Agent, or Firm* — Michael Best & Friedrich LLP (57) ABSTRACT

The invention relates to a wiper device comprising at least one wiper strip unit (12*a-g*) which has at least one first wiper lip (14*a-g*) and at least one second wiper lip (16*a-g*). The wiper device (10*a-g*) has at least one automatically activated wiper lip switching unit (20*a-g*) which is provided in order to switch a wiper lip (18*a-g*) that is active in at least one sub-process of a wiping process.

15 Claims, 5 Drawing Sheets

(56) References Cited

FOREIGN PATENT DOCUMENTS

| | | | |
|---|---|---|---|
| DE | 4317833 | 12/1994 | |
| DE | 19906522 A1 * | 8/2000 | ................ B60S 1/38 |
| DE | 102007045253 A1 | 4/2009 | |
| DE | 102011102408 | 11/2012 | |
| DE | 102012210094 | 12/2012 | |
| FR | 2806993 | 10/2001 | |
| FR | 2963765 | 2/2012 | |
| WO | 8001155 | 6/1980 | |

* cited by examiner

WIPER DEVICE

BACKGROUND OF THE INVENTION

Wiper blades of windshield wipers comprising a wiper strip unit, said wiper blades having a first wiper lip and a second wiper lip, have already been proposed in the publications DE 1 170 806 B, DE 27 05 700 A1 and DE 43 17 833 A2. Switching between the wiper lips is achieved in this case by frictional contact with a windshield when reversing a movement of a wiper blade.

SUMMARY OF THE INVENTION

The invention is based on a wiper device comprising at least one wiper strip unit which has a first wiper lip and at least one second wiper lip.

At least one automatically activated wiper lip switching unit is proposed, said wiper lip switching unit being provided in order to switch a wiper lip which is active in at least one sub-process of a wiping process.

"Wiper strip unit" is intended to be understood, in particular, as a unit made from a resilient material which is provided, for cleaning a surface to be cleaned, in particular a windshield surface, preferably a surface of a vehicle windshield, to be pressed against the surface to be cleaned and to be moved in contact across the surface to be cleaned. Preferably, the resilient material of the wiper strip unit is formed from a natural or synthetic elastomer material, in particular rubber. "Wiper lip" is intended to be understood, in particular, as an element made of elastomer material comprising an advantageously tapering contact region with a windshield, wherein the contact region is provided to be moved across the windshield, in contact with a windshield, in order to clean the windshield of dirt and liquids, in particular rain water or washer fluid. Preferably, the wiper lip is integrally configured with the wiper strip unit and is particularly preferably produced in one piece with the wiper strip unit. A "first wiper lip" and a "second wiper lip" are intended to be understood, in particular, as two wiper lips of the same wiper strip unit, which are preferably arranged on opposing sides of the wiper strip unit. An "automatically activated wiper lip switching unit" is intended to be understood, in particular, as a unit which has at least one element activated by motor by which at least one component of a wiper blade, in particular a wiper strip unit, may be actively moved in order to switch at least one wiper lip. By "actively move" it is intended to be understood, in particular, that the movement of the component of the wiper blade is different from a movement of the wiper blade effected by a wiper arm across the windshield and from a movement of components of the wiper blade effected by an interaction of a windshield surface with the wiper blade moved by the wiper arm, in particular from a twisting of the wiper lip by a change of direction in a turning process of a wiping process.

An "active wiper lip" is intended to be understood, in particular, as a wiper lip which removes at least a large proportion of liquids from the windshield in at least one wiping action. "Wiper lip which removes at least a large proportion of liquids from the windshield" is intended to be understood, in particular, as a wiper lip by means of which at least sixty percent, advantageously at least seventy five percent and preferably at least ninety percent of a volume of liquid is removed, said liquid being removed in at least one sub-process of a windshield cleaning procedure, in particular during at least one wiping action from one side to another side. In particular, a wiper lip of two or more different wiper lips is effective as an active wiper lip, said wiper lip being in contact with a windshield, whereas other wiper lips of the two or more wiper lips are arranged without contact on the windshield. A "wiping process" is intended to be understood, in particular, as a process in which a wiper blade of a windshield wiper is guided from an initial position on a windshield in a wiping action in a direction across the windshield, a movement direction of the wiper blade is reversed in a turning process and the wiper blade is returned into the initial position in a wiping action in the opposing direction. A "sub-process of a wiping process" is intended to be understood, in particular, as a wiping action or a turning process. By "to change a wiper lip which is active in at least one sub-process of a wiping process" it is intended to be understood, in particular, that in different sub-processes of a wiping process, in particular in different wiping actions, different wiper lips are effective as active wiper lips and said wiper lips are switched by the automatically activated wiper lip switching unit by an active movement. In particular, a switching of the active wiper lip may be provided between two wiper actions and the switching may take place in a turning process. In principle, it is also possible to carry out a plurality of wiping actions with the same active wiper lip and to switch the active wiper lip only after a plurality of wiping actions and turning processes. "Provided" is intended to mean, in particular, specifically designed, equipped and/or programmed. By "an object being provided for a specific function" it is intended to be understood, in particular, that the object fulfills and/or carries out this specific function in at least one usage state and/or operating state.

By means of the embodiment of the wiper device according to the invention, in particular an impact of the wiper strip unit during turning may be avoided when switching a wiping direction and a low mechanical loading of the wiper strip unit may be achieved.

It is further proposed that the automatically activated wiper lip switching unit is provided in order to move at least partially the wiper strip unit in a turning process. By "to move at least partially" it is intended to be understood, in particular, that the automatically activated wiper lip switching unit is provided to move actively at least one partial element, in particular the at least one first wiper lip and/or the at least one second wiper lip, or the wiper strip unit as a whole. In particular, it is possible to achieve a switching of an active wiper lip by the automatically activated wiper lip switching unit in a manner which is able to be carried out easily.

It is further proposed that the automatically activated wiper lip switching unit is provided to switch between a first operating state in which the at least one first wiper lip is effective as the active wiper lip and the at least one second wiper lip is arranged without contact on a windshield, and a second operating state in which the at least one second wiper lip is effective as the active wiper lip and the at least one first wiper lip is arranged without contact on the windshield. A switch between the first operating state and the second operating state may be achieved, in particular, by the at least one first wiper lip and/or the at least one second wiper lip being moved relative to one another by the automatically activated wiper lip switching unit and toward at least one component of the wiper strip unit or by pivoting at least one part of the wiper strip unit. Preferably, the first operating state and the second operating state are used in different sub-processes of the wiping process, in particular in different wiping actions in different wiping directions. Preferably, in the first operating state the at least one first wiper lip is arranged on a side of the wiper strip unit facing away from the wiping direction of the first operating state and the at least one second wiper lip is arranged on a side of the wiper strip unit facing the wiping direction of the first operating state and in the second operating state the at least one second wiper lip is arranged on a side of the wiper strip unit facing away from the wiping direction of the second operating state and the at least one first wiper lip is arranged on a side of the wiper strip unit facing the wiping direction of the second operating state, wherein the wiping directions of the first operating state and of the second operating state are oriented counter to one another. In particular, it is possible to achieve a switching of the active wiper lip which is able to be carried out in a simple manner.

It is further proposed that the automatically activated wiper lip switching unit is provided to move at least substantially without friction and at least partially the wiper strip unit for switching between the first operating state and the second operating state. By "move at least substantially without friction" it is intended to be understood, in particular, that a movement for switching the active wiper lip, in particular a movement for switching between the first operating state and the second operating state, is different from a movement which is caused by frictional contact of the windshield with components of the wiper strip unit which are in contact with the windshield. In particular, it is possible to achieve a controllable switching of the active wiper lip which is able to be set at any time, in particular independently of a state of motion of the windshield wiper.

In a development of the invention, it is proposed that the automatically activated wiper lip switching unit is provided to move the at least one first wiper lip and the at least one second wiper lip for switching between the first operating state and the second operating state relative to a top strip of the wiper strip unit. A "top strip" of the wiper strip unit is intended to be understood, in particular, as a partial unit of the wiper strip unit which is arranged facing away from the at least one first wiper lip and the at least one second wiper lip and on which the wiper strip unit is connected to further components of a wiper blade. In particular, it is possible to achieve a switching of the active wiper lip which is able to be accurately set and easily carried out.

It is further proposed that the automatically activated wiper lip switching unit is provided to pivot the at least one first wiper lip and the at least one second wiper lip relative to the top strip by an angle. By "the at least one first wiper lip and the at least one second wiper lip are pivoted relative to the top strip" it is intended to be understood, in particular, that when switching the active wiper lip the top strip remains in a fixed orientation relative to further components of the wiper blade, and that the at least one first wiper lip and the at least one second wiper lip are pivoted by an angle relative to the top strip and the further components of the wiper blade. In particular, it is possible to achieve a specific switching of the active wiper lip with conventional guidance of a wiper blade.

It is further proposed that the automatically activated wiper lip switching unit is provided to move the at least one first wiper lip and the at least one second wiper lip independently of one another. By "move independently of one another" it is intended to be understood, in particular, that the at least one first wiper lip may be moved and the at least one second wiper lip remains in a previous orientation or the at least one second wiper lip may be moved and the at least one first wiper lip remains in a previous orientation or the at least one first wiper lip and the at least one second wiper lip may be moved at the same time. In particular, it is possible to achieve a highly flexible, automatically activated wiper lip switching unit.

In a development of the invention, it is proposed that the automatically activated wiper lip switching unit is provided to pivot the wiper strip unit as a whole by an angle. In particular, it is possible to achieve a structurally simple, automatically activated wiper lip switching unit.

It is further proposed that the automatically activated wiper lip switching unit comprises at least one piezo element. A "piezo element" is intended to be understood, in particular, as an element which directly converts control signals of an electrical control unit into a movement. In particular, the piezo element is configured as a piezo actuator. In particular, it is possible to achieve an automatically activated wiper lip switching unit with a small space requirement.

It is further proposed that the automatically activated wiper lip switching unit comprises at least one hydraulic unit. A "hydraulic unit" is intended to be understood, in particular, as a unit which uses at least one liquid, in particular water, for transmitting forces and a movement of components. In particular, it is possible to achieve a structurally simple and robust, automatically activated wiper lip switching unit.

It is further proposed that the automatically activated wiper lip switching unit comprises at least one pneumatic unit. A "pneumatic unit" is intended to be understood, in particular, as a unit which transmits a force by means of air and causes a movement of a component. In particular, it is possible to achieve a structurally simple and robust, automatically activated wiper lip switching unit.

It is further proposed that the automatically activated wiper lip switching unit comprises at least one magnetic unit. A "magnetic unit" is intended to be understood, in particular, as a unit with at least one magnet, preferably with at least one electromagnet, which is provided to move magnetically at least one component. "Move magnetically" is intended to be understood, in particular, as a movement of a component by means of a magnetic force exerted on the component. In particular, the magnetic unit is provided at least to move magnetically the at least one first wiper lip and/or the at least one second wiper lip by means of the magnetic elements incorporated in the at least one first wiper lip and/or the at least one second wiper lip relative to a top strip of the wiper strip unit. In particular, it is possible to achieve a structurally simple and easily controllable, automatically activated wiper lip switching unit which is of simple construction and is able to be activated in a simple manner.

It is further proposed that the magnetic unit is provided to move magnetically the at least one first wiper lip and/or the at least one second wiper lip. In particular, it is possible to achieve a structurally simple, automatically activated wiper lip switching unit which is of simple construction and of low cost and which acts with a low energy requirement.

It is further proposed that the at least one first wiper lip comprises at least one shape memory element. A "shape memory element" is intended to be understood, in particular, as an element which is at least partially produced from a shape memory material, in particular a shape memory alloy or a shape memory polymer, which undergoes a deflection and a deformation when a magnetic field is applied and which automatically returns to the shape before the deflection and deformation after the magnetic field is switched off. In particular, the shape memory element is embedded in an elastomer material of the at least one first wiper lip and provided for reinforcing the at least one first wiper lip. In particular, the shape memory element of the at least one first wiper lip is provided to be deflected by means of a magnetic force, by the magnetic unit for switching the active wiper lip, preferably in the direction of a top strip and by switching on the magnetic field, and to return automatically to an initial position after the magnetic field has been switched off. In particular, it is possible to achieve a first wiper lip to be moved in a simple manner.

It is further proposed that the at least one second wiper lip comprises at least one shape memory element. In particular, it is possible to achieve a second wiper lip to be moved in a simple manner.

It is further proposed that the wiper device comprises a control unit which is provided for activating the automatically activated wiper lip switching unit. In particular, the control unit is provided for activating the automatically activated wiper lip switching unit in a turning process. A "turning process" is intended to be understood, in particular, as a sub-process of a wiping process in which a movable wiper blade is braked and reversed in a direction of movement thereof. In particular, it is possible to achieve an advantageously quiet wiping action.

It is further proposed that the automatically active wiper lip switching unit comprises at least one active lifting unit which is provided to lift at least the wiper strip unit in the turning process. By "at least the wiper strip unit is lifted in the turning process" it is intended to be understood, in particular, that in the turning process the distance from a windshield is increased and to this end at least the wiper strip unit, preferably the wiper blade as a whole, is lifted. Preferably, the active wiper lip is switched during the lifting of at least the wiper strip unit. In particular, it is possible to achieve a quiet switching of the active wiper lip and a further avoidance of shifting noise when switching the active wiper lip.

It is further proposed that the at least one first wiper lip and the at least one second wiper lip are connected via a concave surface of the wiper strip unit. By "connected via a concave surface" it is intended to be understood, in particular, that the at least one first wiper lip and the at least one second wiper lip are connected together via a surface of the wiper strip unit configured without edges, which has a concave path. In particular, viewed in the wiping direction, the at least one first wiper lip and the at least one second wiper lip protrude at an angle from a base body of the wiper strip unit, on which the concave surface of the wiper strip unit is arranged, which is different from ninety degrees by at least ten degrees, advantageously by at least twenty degrees and preferably by at least thirty degrees. Preferably, the end points of the at least one first wiper lip, the at least one second wiper lip and a central point of the concave surface of the wiper strip unit span an equilateral triangle. In particular, it is possible to achieve a wiper strip unit with an advantageously small pivoting range required for switching the active wiper lip.

It is further proposed that the wiper device comprises at least one adapter unit for connecting a wiper blade to a wiper arm, said adapter unit comprising the automatically activated wiper lip switching unit. In particular, the adapter unit comprises a wiper blade adapter and/or a wiper arm adapter. Preferably, the automatically activated wiper lip switching unit arranged in the adapter unit is provided to pivot the wiper blade, and thus the wiper strip unit as a whole, by an angle. In particular, it is possible to achieve a structurally simple, automatically activated wiper lip switching unit.

It is further proposed that the wiper device comprises at least one bearing unit for bearing a wiper arm, said bearing unit comprising the automatically activated wiper lip switching unit. A "bearing unit for bearing a wiper arm" is intended to be understood, in particular, as a unit in a partial region of a vehicle body which is provided to receive and to bear the wiper arm. Preferably, the automatically activated wiper lip switching unit of the bearing unit is provided to pivot the wiper arm, and thus a wiper blade fastened to the wiper arm as a whole, by an angle. In particular, it is possible to achieve a structurally simple, automatically activated wiper lip switching unit.

It is further proposed that a relative orientation of the at least one first wiper lip to the at least one second wiper lip is fixed in the unloaded state. An "unloaded state" is intended to be understood, in particular, as a state in which the wiper strip unit is free from contact with a windshield. By "a relative orientation of the at least one first wiper lip to the at least one second wiper lip is fixed in the unloaded state" it is intended to be understood, in particular, that in the unloaded state the at least one first wiper lip and the at least one second wiper lip are not able to be displaced relative to one another, except for material flexibility, and for switching the active wiper lip which takes place during the unloaded state, the wiper strip unit is moved as a whole and is preferably pivoted. In particular, it is possible to achieve a wiper strip unit with high degree of stability.

The wiper device according to the invention is intended not to be limited here to the above-described application and embodiment. In particular, for fulfilling a functionality described herein the wiper device according to the invention may have a number of individual elements, components and units which is different from that cited herein.

BRIEF DESCRIPTION OF THE DRAWINGS

Further advantages are revealed from the following description of the drawings. In the drawings, seven exemplary embodiments of the invention are shown. The drawings, the description and the claims contain numerous features in combination. The person skilled in the art will also expediently consider the features individually and combine them to form further meaningful combinations.

In the drawings.

DETAILED DESCRIPTION

Figure 1:
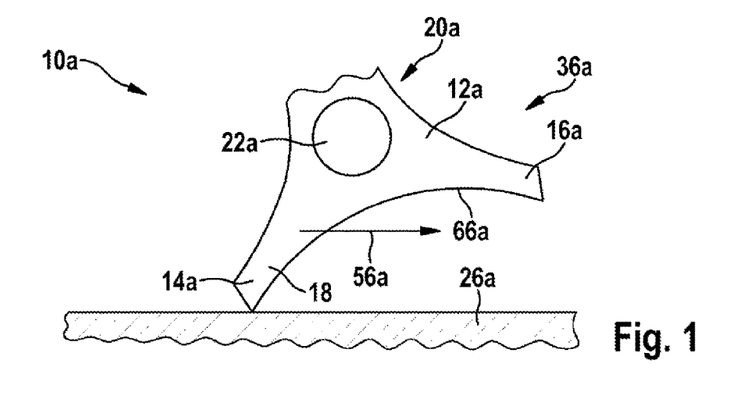
FIG. 1 shows a wiper device according to the invention having a first wiper lip and a second wiper lip in a first operating state in which the first wiper lip is effective as the active wiper lip.

FIG. 1 shows a wiper device 10a for cleaning a windshield 26a comprising a wiper strip unit 12a, which has a first wiper lip 14a and a second wiper lip 16a. The wiper strip unit 12a is produced from a rubber material and is integrally produced with the first wiper lip 14a and the second wiper lip 16a in an extrusion process. The first wiper lip 14a and the second wiper lip 16a have a contact region with a windshield 26a for cleaning liquids from the windshield 26a. The wiper device 10a has an automatically activated wiper lip switching unit 20a which is provided to switch a wiper lip 18a which is active in at least one sub-process of a wiping process. A wiping process is made up of a wiping action in a wiping direction 56a (FIG. 1), a turning process (FIG. 2) in which a movement of the wiper strip unit 12a is reversed and a wiping action in an opposing wiping direction 58a (FIG. 3). An active wiper lip 18a denotes a first wiper lip 14a or a second wiper lip 16a which in a wiping action removes a large proportion of liquids from the windshield 26a, wherein "a large proportion of liquids" is understood as a proportion of at least ninety percent of a volume of liquids removed in a sub-process of a windshield cleaning procedure. For switching the active wiper lip 18a the automatically activated wiper lip switching unit 20a moves the wiper strip unit 12a in the turning process. The wiper strip unit 12a has an axle receiver 22a which is provided for receiving an axle 24a which is able to be moved and rotated by the active wiper lip switching unit 20a (FIG. 4). The axle 24a is rotationally coupled to the wiper strip unit 12a via a frictional connection, but in principle drive elements may also be provided, such as for example shaped portions protruding from the axle 24a for engagement in corresponding recesses of the wiper strip unit 12a on the axle receiver 22a in order to couple the wiper strip unit 12a in a rotational manner to the axle 24a. The automatically activated wiper lip switching unit 20a actively moves the wiper strip unit 12a via the axle 24a and the axle receiver 22a, i.e. with a movement which is different from a wiping movement.

The automatically activated wiper lip switching unit 20a is provided to switch between a first operating state in which the first wiper lip 14a is effective as the active wiper lip 18a and the at least one second wiper lip 16a is arranged without contact on the windshield 26a (FIG. 1) and a second operating state in which the at least one second wiper lip 16a is effective as the active wiper lip 18a and the at least one first wiper lip 14a is arranged without contact on the windshield 26a. The first operating state is shown in FIG. 1 and the second operating state in FIG. 3. The first operating state and the second operating state correspond substantially to the wiping actions of the wiping process. In the first operating state and the second operating state in each case the rear wiper lip 14a, 16a, viewed in the wiping direction 56a and/or 58a, is effective as the active wiper lip 18a. The automatically activated wiper lip switching unit 20a is provided to move the wiper strip unit 12a substantially without friction for switching between the first operating state and the second operating state, wherein "a movement substantially without friction" is denoted as a movement which is different from a movement which is caused by friction of the windshield 26a with components of the wiper strip unit 12a which are in contact with the windshield. A movement without friction is also assisted by the wiper strip unit 12a being lifted in the turning process and thus the first wiper lip 14a and the second wiper lip 16a being arranged without contact on the windshield 26a in the turning process. For switching the active wiper lip 18a, the automatically activated wiper lip switching unit 20a pivots the wiper strip unit 12a as a whole by an angle, wherein a pivoting process is carried out during the turning process. By switching the active wiper lip 18a by means of the automatically activated wiper lip switching unit 20a and by a switching movement which takes place without frictional contact with the windshield 26a, a disruptive flipping noise when switching the wiping direction 56a, 58a is eliminated and a particularly quiet wiping process may be achieved. Moreover, liquid is prevented from being sprayed onto cleaned surfaces when the wiper lips 14a, 16a of the wiper strip unit 12a are flipped over.

The first wiper lip 14a and the second wiper lip 16a of the wiper strip unit 12a are connected via a concave surface 66a of the wiper strip unit 12a and, viewed in the wiping direction 56a, 58a, protrude at an angle from a base body of the wiper strip unit 12a on which the concave surface 66a of the wiper strip unit 12a is arranged, which is approximately thirty degrees. By means of the embodiment according to the invention, the wiper strip unit 12a in a region of the concave surface 66a of the first wiper lip 14a and the second wiper lip 16a has a shape which is similar to a shape of a portion having two adjacent points of a star shape, wherein the corners of the star shape are rounded.

Figure 2:
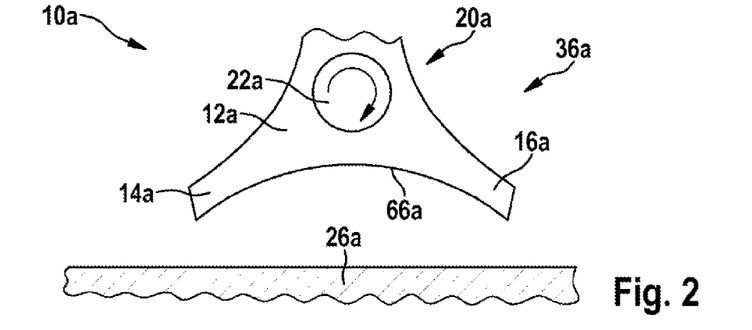
FIG. 2 shows the wiper device according to the invention in a transition effected by the automatically activated wiper lip switching unit between the first operating state and a second operating state in which the second wiper lip is effective as the active wiper lip.
Figure 3:
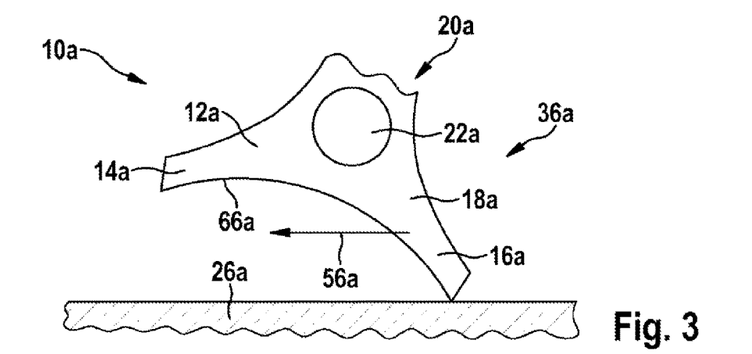
FIG. 3 shows the wiper device according to the invention in the second operating state.
Figure 4:
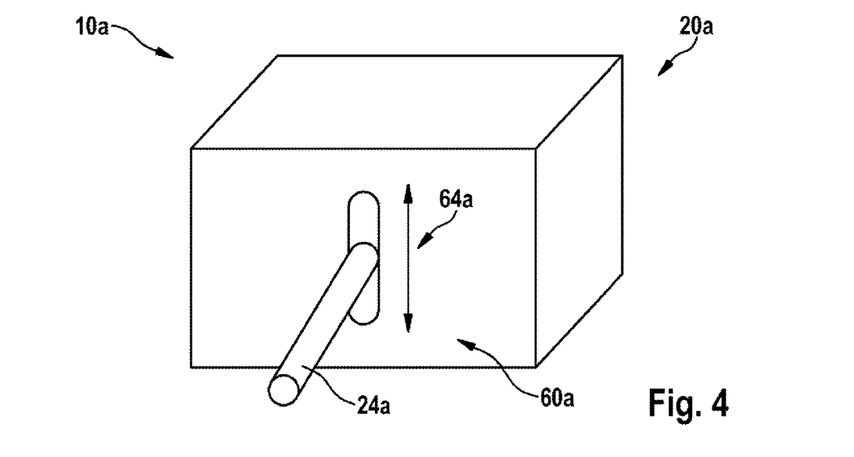
FIG. 4 shows a detailed view of the automatically activated wiper lip switching unit.

FIG. 4 shows a detailed view of the automatically activated wiper lip switching unit 20a of the wiper device 10a, said wiper lip switching unit being integrated in an end cap, which laterally terminates a wiper blade 36a of the wiper device 10a comprising the wiper strip unit 12a, shown in detail in FIGS. 1-3. The automatically activated wiper lip switching unit 20a comprises a piezo element 60a which is provided to set the axle 24a in rotation. The automatically activated wiper lip switching unit 20a further comprises an active lifting unit 64a which is provided to lift the wiper strip unit 12a in a turning process (FIG. 2). To this end, the active lifting unit 64a comprises an actuator which is able to displace the axle 24a vertically and the axle 24a is configured as a bearing axle of the wiper strip unit 12a, said wiper strip unit being mounted on said bearing axle. In an alternative embodiment, the active lifting unit may also be integrated in a wiper arm, not shown, and effect a lifting of the entire wiper arm, so that the wiper strip unit 12a is lifted as a whole. In this embodiment, the wiper strip unit 12a is pivoted as a whole by an angle exclusively by means of the axle 24a.

In FIGS. 5 to 10, six further exemplary embodiments of the invention are shown. The following descriptions and the drawings are limited substantially to the differences between the exemplary embodiments, wherein as regards components which are denoted the same, in particular relative to components with the same reference numerals, in principal reference is also made to the drawings and/or the description of the other exemplary embodiments, in particular FIGS. 1 to 4. In order to differentiate between the exemplary embodiments the letter a is placed after the reference numerals of the exemplary embodiment of FIGS. 1 to 4. In the exemplary embodiments of FIGS. 5 to 10, the letter a is replaced by the letters b to g.

Figure 5:
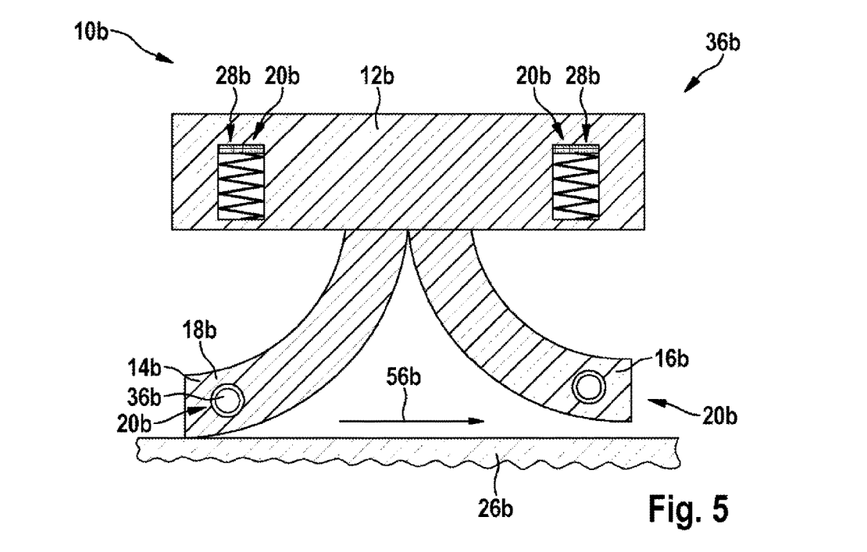
FIG. 5 shows an alternative wiper device in which the automatically activated wiping lip switching unit comprises a magnetic unit which moves the magnetic elements in a first wiper lip and a second wiper lip for switching the active wiper lip.

FIG. 5 shows an alternative wiper device 10b comprising a wiper strip unit 12b which has a first wiper lip 14b and a second wiper lip 16b and comprising an automatically activated wiper lip switching unit 20b which is provided to switch a wiper lip 18b which is active in at least one sub-process of a wiping process. The automatically activated wiper lip switching unit 20b comprises a magnetic unit 28b. The magnetic unit 28b has two electromagnets incorporated in a top strip of the wiper strip unit 12b and is provided to move magnetically the first wiper lip 14b and the second wiper lip 16b. To this end, magnetic elements 30b are incorporated in the first wiper lip 14b and the second wiper lip 16b on which a force is exerted by means of the magnetic unit 28b, so that by means of the force on the magnetic elements 30b the first wiper lip 14b and/or the second wiper lip 16b are pulled in the direction of the top strip and thus lifted away from the windshield 26b. To this end, one respective electromagnet of the magnetic unit 28b is arranged in each case opposing the first wiper lip 14b and the second wiper lip 16b, wherein a magnetic force applied onto a magnetic element 30c in a wiper lip 14b, 16b which is located remotely is negligible due to the spacing.

In FIG. 5 a first operating state is shown, in which the first wiper lip 14b is effective as the active wiper lip 18b and the second wiper lip 16b is mounted without contact on a windshield 26b. The automatically activated wiper lip switching unit 20b is provided to move the first wiper lip 14b and the second wiper lip 16b for switching between the first operating state and a second operating state, in which the second wiper lip 16b is effective as the active wiper lip 18b and the first wiper lip 16b is mounted without contact on the windshield 26b, relative to a top strip of the wiper strip unit 12b. A movement relative to the top strip of the wiper strip unit 12b in this case is achieved by lifting away from and/or lowering toward the windshield 26b. A wiper lip 14b, 16b which has not been lifted away is effective as the active wiper lip 18b. By switching a current flow between the electromagnets of the magnetic unit 28b, therefore, the active wiper lip 18b is switched. The automatically activated wiper lip switching unit 20b is provided to move the first wiper lip 14b and the second wiper lip 16b independently of one another. To this end, the two electromagnets of the magnetic unit 28b may be switched on separately so that they respectively lift one of the wiper lips 14b, 16b away from the windshield 26b. The magnetic elements 30b are arranged in a region in the vicinity of the tips of the first wiper lip 14b and/or the second wiper lip 16b, so that by means of the automatically activated wiper lip switching unit 20b the first wiper lip 14b and the second wiper lip 16b are pivoted relative to the top strip by an angle, when the active wiper lip 18b is switched.

Figure 6:
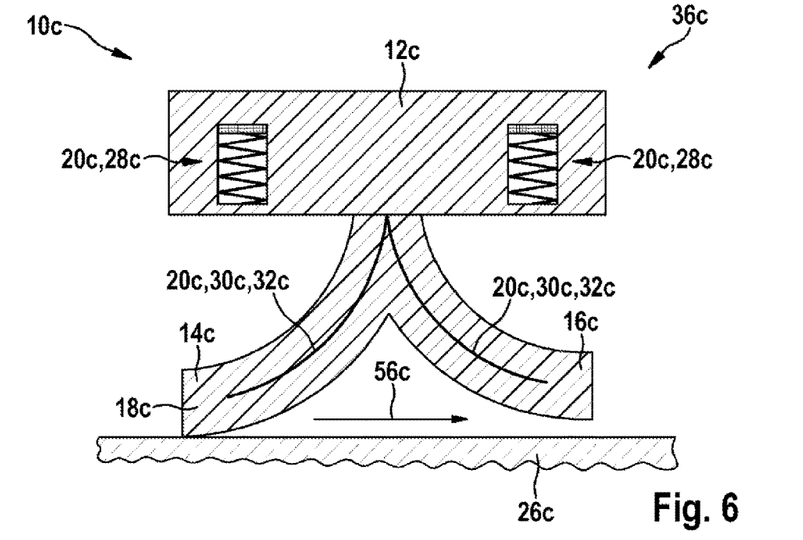
FIG. 6 shows a further alternative wiper device with an automatically activated wiper lip switching unit comprising a magnetic unit, wherein magnetic elements are formed in a first wiper lip and a second wiper lip as shape memory elements.

FIG. 6 shows a further alternative wiper device 10c comprising a wiper strip unit 12c which has a first wiper lip 14c and a second wiper lip 16c, and comprising an automatically activated wiper lip switching unit 20c which is provided to switch a wiper lip 18c which is active in at least one sub-process of a wiping process. The wiper lip switching unit 20c comprises a magnetic unit 28c. The first wiper lip 14c comprises a shape memory element 32c and the second wiper lip 16c comprises a shape memory element 34c. The shape memory elements 32c, 34c are configured as magnetic elements 30c onto which a magnetic force of the magnetic unit 28b is exerted for switching the active wiper lip 18c and partially consist of a magnetic shape memory alloy which alters its shape by a magnetic field being applied by the magnetic unit 28c, whereby it is possible to achieve a lifting of the first wiper lip 14c and/or the second wiper lip 16c away from a windshield 26c. When switching off the magnetic field, the shape memory elements 32c, 34c return to a shape which existed before the magnetic field was applied.

Figure 7:
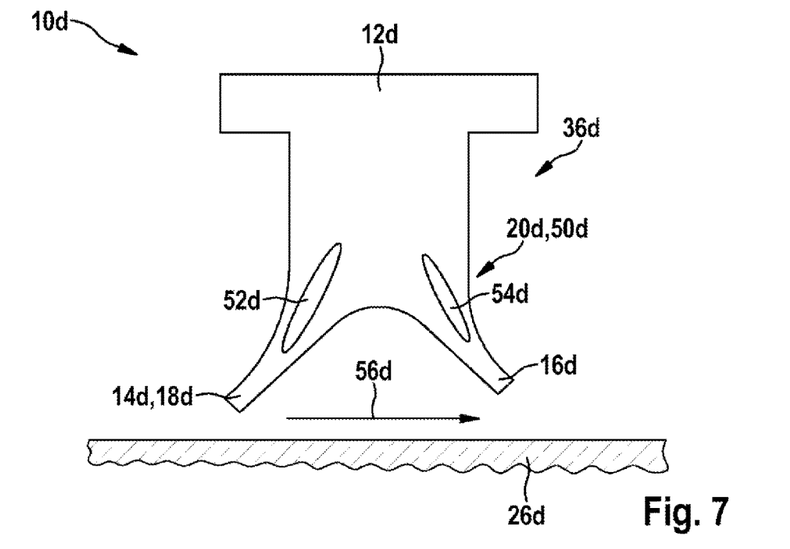
FIG. 7 shows an alternative wiper device with an automatically activated wiper lip switching unit comprising a hydraulic unit or a pneumatic unit.

FIG. 7 shows a further alternative wiper device 10d comprising a wiper strip unit 12d which has a first wiper lip 14d and a second wiper lip 16d, and comprising an automatically activated wiper lip switching unit 20d which is provided to switch a wiper lip 18d which is active in at least one sub-process of a wiping process. The automatically activated wiper lip switching unit 20d comprises a hydraulic unit 50d. A hollow space 52d is formed in the wiper strip unit 12d at a transition between a base body of the wiper strip unit 12d and the first wiper lip 14d, whilst a further hollow space 54d is formed in the wiper strip unit 12d at a transition between the base body and the second wiper lip 16d. The hydraulic unit 50d pumps liquid from one of the hollow spaces 52d, 54d into the other respective hollow space for switching the active wiper lip 18d, wherein the hollow spaces 52d, 54d are designed such that when filling the hollow space 52, 54d a volume of the hollow space 52d, 54d is widened and as a result the first wiper lip 14d and/or the second wiper lip 16d is moved in a direction toward the windshield 26d. A wiper lip 14d, 16d which is positioned closest to the windshield 26d is then effective as the active wiper lip 18d. By pumping the liquid across, therefore, it is possible to achieve a switching of the active wiper lip 18d.

In a further alternative embodiment, the automatically activated wiper lip switching unit 20a comprises, instead of a hydraulic unit 50d, a pneumatic unit which instead of a liquid pumps a quantity of air for switching the active wiper lip 18d.

Figure 8:
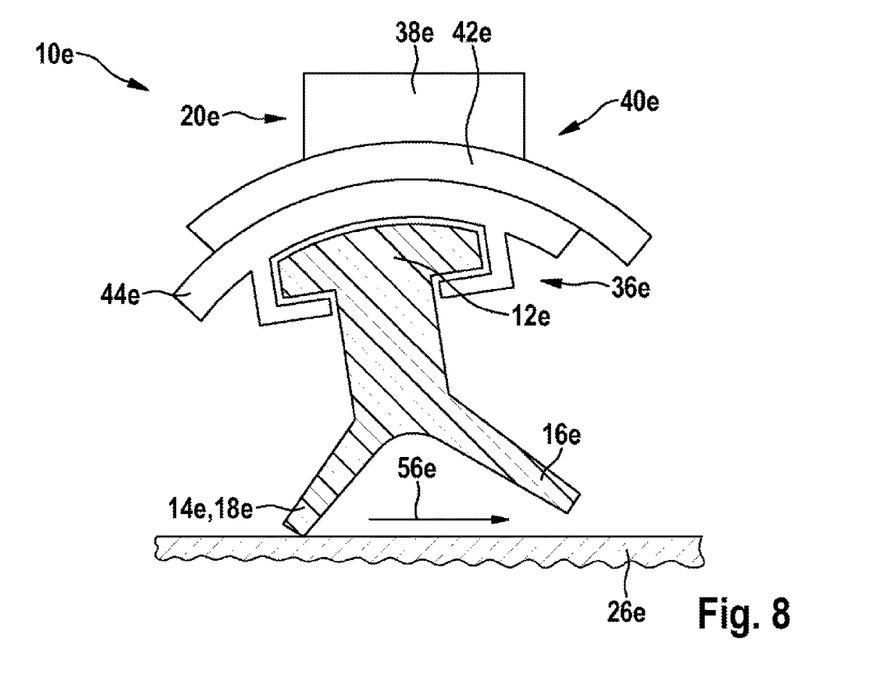
FIG. 8 shows an alternative wiper device with an automatically activated wiper lip switching unit arranged in an adapter unit.
Figure 9:
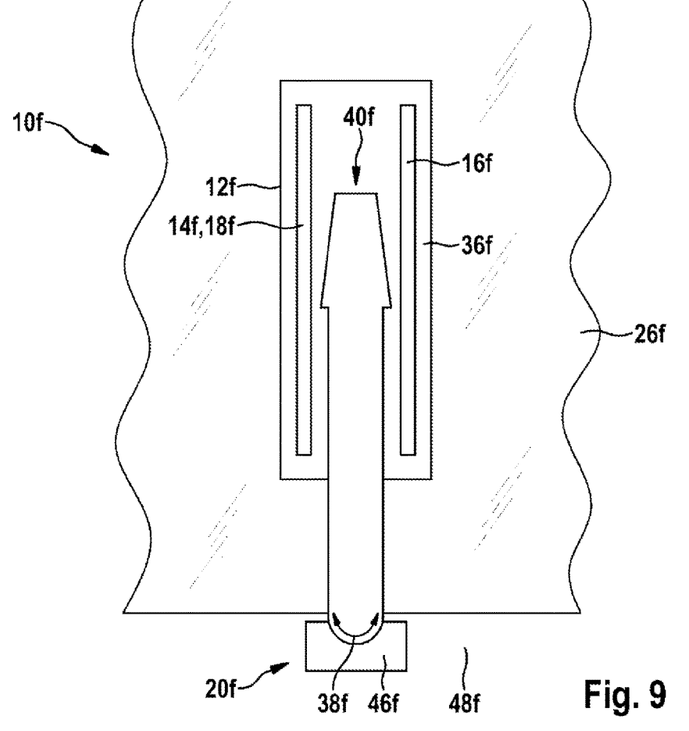
FIG. 9 shows an alternative wiper device with an automatically activated wiper lip switching unit arranged in a bearing unit for bearing a wiper arm and FIG. 10 shows a functional diagram of a wiper device according to the invention with a control unit.
Figure 10:
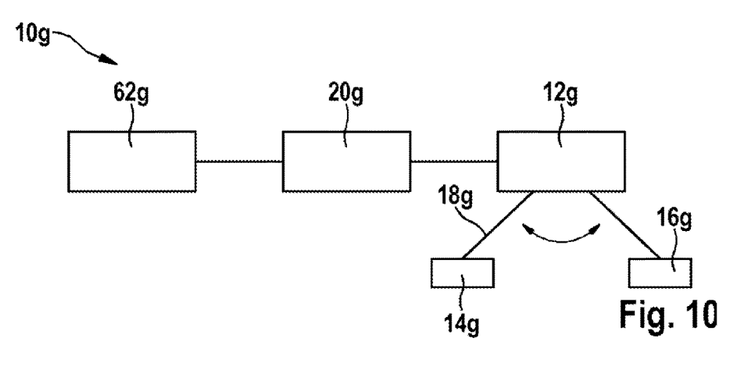

In FIG. 8 is a further alternative wiper device 10e comprising a wiper strip unit 12e, which has a first wiper lip 14e and a second wiper lip 16e, and comprising an automatically activated wiper lip switching unit 20e which is provided for switching a wiper lip 18e which is active in at least one sub-process of a wiping process. The wiper device 10e comprises an adapter unit 40e for connecting a wiper blade 36e to a wiper arm 38e, said adapter unit having the automatically activated wiper lip switching unit 20e. The adapter unit 40e comprises a wiper blade adapter 44e fastened to the wiper blade 36e and a wiper arm adapter 42e fastened to the wiper arm 38e, wherein the wiper arm adapter 42e encloses the wiper blade adapter 44e by half. The wiper blade adapter 44e may be moved relative to the wiper arm adapter 42e by the automatically activated wiper lip switching unit 20e between different positions, whereby an angle between the wiper strip unit 12e and a windshield 26e may be varied. By means of the movement, the active wiper lip 18e is switched by the angle between the wiper strip unit 12e and a windshield 26e being altered such that the first wiper lip 14e and/or the second wiper lip 16e is lifted away from the windshield 26e and the second wiper lip 16e and/or the first wiper lip 14e is brought into contact with the windshield 26e.

In a further alternative exemplary embodiment of the invention (FIG. 9) a wiper device 10f comprises a wiper strip unit 12f which has a first wiper lip 14f and a second wiper lip 16f, and an automatically activated wiper lip switching unit 20f which is provided for switching a wiper lip 18f which is active in at least one sub-process of a wiping process, and a bearing unit 46f for bearing a wiper arm 38f which has the automatically activated wiper lip switching unit 20f. The bearing unit 46f is attached in a bodywork region 48f of a motor vehicle in the vicinity of a windshield 26f of the motor vehicle. The bearing unit 46f bears the wiper arm 38f in a rotatable manner about a wiper arm axle which is suitable for said body, wherein a wiper blade 36f fastened to the wiper arm 38f via an adapter unit 40f is also rotated by a rotation of the wiper arm 38f by means of the automatically activated wiper lip switching unit 20f. In particular, as a result, the wiper strip unit 12f is also rotated and an angle altered between the wiper strip unit 12f and the windshield 26f, whereby an active wiper lip 18f is switched.

In a schematic view (FIG. 10) of a further alternative embodiment of a wiper device 10g, the wiper device 10g comprises a control unit 62g which is provided for activating an automatically activated wiper lip switching unit 20g. By means of the activation, a switching of an active wiper lip 18g is effected between a first wiper lip 14g and a second wiper lip 16g of a wiper strip unit 12g. The control unit 62g may be integrated in an electronic unit of a vehicle or configured separately and may be used for activating the switching of a wiper lip in all exemplary embodiments described above.

What is claimed is:

1. A wiper device comprising at least one wiper strip unit (12a-g) which has at least one first wiper lip (14a-g) and at least one second wiper lip (16a-g), and at least one automatically activated wiper lip switching unit (20a-g) configured to switch a wiper lip (18a-g) which is active in at least one sub-process of a wiping process, wherein the automatically activated wiper lip switching unit (20a-g) is configured to switch between a first operating state in which the at least one first wiper lip (14a-g) is effective as the active wiper lip (18a-g) and the at least one second wiper lip (16a-g) is arranged without contact on a windshield (26a-g), and a second operating state in which the at least one second wiper lip (16a) is effective as the active wiper lip (18a) and the at least one first wiper lip (14a) is arranged without contact on the windshield (26a-g), wherein the automatically activated wiper lip switching unit (20b-d) is configured to independently pivot the at least one first wiper lip (14b-d) relative to a top strip of the wiper strip unit (12b-d), and is configured to independently pivot the at least one second wiper lip (16b-d) relative to the top strip of the wiper strip unit (12b-d), for switching between the first operating state and the second operating state, wherein the top strip is configured to remain in a fixed orientation as the at least one first wiper lip (14b-d) independently pivots relative to the top strip and the at least one second wiper lip (16b-d) independently pivots relative to the top strip, wherein the independent pivoting of the at least one first wiper lip and the at least one second wiper lip is such that when switching to the first operating state the at least one first wiper lip is configured to be moved and the at least one second wiper lip is configured to remain in a previous orientation and when switching to the second operating state the at least one second wiper lip is configured to be moved and the at least one first wiper lip is configured to remain in a previous orientation, and wherein the independent pivoting of the at least one first and second wiper lips is independent of engagement of the at least one first and second wiper lips with the windshield.

2. The wiper device as claimed in claim 1, wherein the automatically activated wiper lip switching unit (20b-d) is configured to pivot the at least one first wiper lip (14b-d) and the at least one second wiper lip (16b-d) relative to the top strip by an angle.

3. The wiper device as claimed in claim 1, wherein the automatically activated wiper lip switching unit (20a) comprises at least one piezo element (60a).

4. The wiper device as claimed in claim 1, wherein the automatically activated wiper lip switching unit (20d) comprises at least one hydraulic unit (50d).

5. The wiper device as claimed in claim 1, wherein the automatically activated wiper lip switching unit (20d) comprises at least one pneumatic unit.

6. The wiper device as claimed in claim 1, wherein the automatically activated wiper lip switching unit (20b-c) comprises at least one magnetic unit (28b-c).

7. The wiper device as claimed in claim 6, wherein the at least one magnetic unit (28b-c) includes a first magnetic unit (28b) that is configured to magnetically pivot the at least one first wiper lip (14b) relative to the top strip and a second magnetic unit (28b) that is configured to magnetically pivot the at least one second wiper lip (16b) relative to the top strip.

8. The wiper device as claimed in claim 7, wherein the first wiper lip (14c) comprises at least one shape memory element (32c).

9. The wiper device as claimed in claim 7, wherein the second wiper lip (16c) comprises at least one shape memory element (34c).

10. The wiper device as claimed in claim 1, further comprising a control unit (62g) for activating the automatically activated wiper lip switching unit (20g).

11. The wiper device as claimed in claim 1, wherein the automatically activated wiper lip switching unit (20a) comprises at least one active lifting unit (64a) which is configured to lift at least the wiper strip unit (12a) in a turning process.

12. The wiper device as claimed in claim 1, wherein the at least one first wiper lip (14a) and the at least one second wiper lip (16a) are connected via a concave surface (66a) of the wiper strip unit (12a).

13. The wiper device at least as claimed in claim 1, further comprising at least one adapter unit (40e) for connecting a wiper blade (36e) to a wiper arm (38e), said adapter unit comprising the automatically activated wiper lip switching unit (20e).

14. The wiper device at least as claimed in claim 1, further comprising at least one bearing unit (46f) for bearing a wiper arm (38f), said bearing unit comprising the automatically activated wiper lip switching unit (20f).

15. The wiper device at least as claimed in claim 1, wherein the wiper lip switching unit is disposed in the top strip.

* * * * *